J. A. FIRSCHING.
BASE OR STAND.
APPLICATION FILED MAR. 1, 1913.
1,090,702.
Patented Mar. 17, 1914.
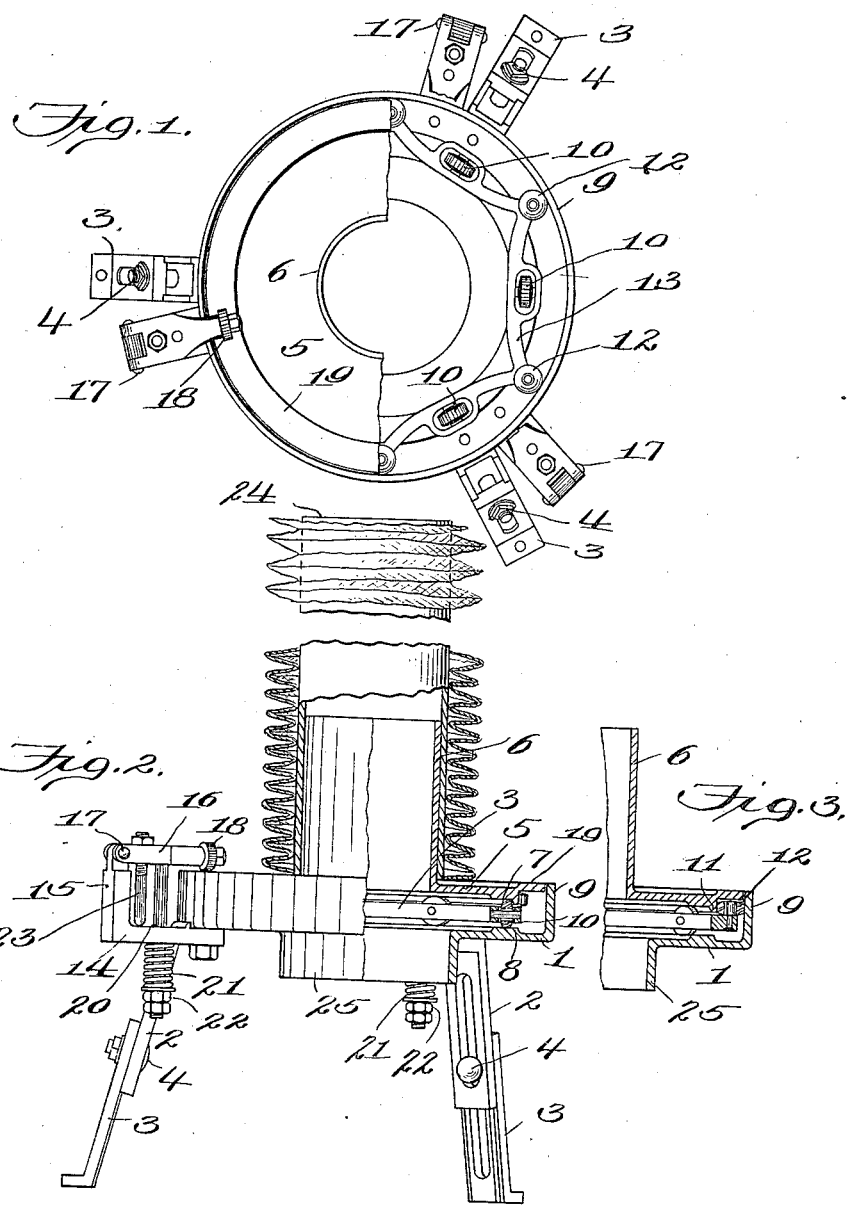
WITNESSES:
INVENTOR
Joseph A. Firsching
BY
ATTORNEY

UNITED STATES PATENT OFFICE.

JOSEPH A. FIRSCHING, OF UTICA, NEW YORK.

BASE OR STAND.

1,090,702. Specification of Letters Patent. Patented Mar. 17, 1914.

Application filed March 1, 1913. Serial No. 751,621.

*To all whom it may concern:*

Be it known that I, JOSEPH A. FIRSCHING, a citizen of the United States, residing at Utica, in the county of Oneida and State of New York, have invented new and useful Improvements in Bases or Stands, of which the following is a specification.

This invention provides a base or stand which is especially applicable to apparatus for drying or otherwise handling tubular fabric, the base or stand being employed as a support for the tube on which the fabric is loaded, it allowing the loading tube to tilt while the operator is loading the fabric thereon, thereby avoiding loosening or straining of the base or its fastenings, and as the fabric is withdrawn from the tube and passed over a spreader, the tube and the base supporting it will be capable of rotation to straighten out twists in the fabric.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a top plan view, partly in section, of a base or stand constructed in accordance with the present invention; Fig. 2 represents a side elevation, partly in section, of the base as shown in Fig. 1 and showing the loading tube mounted thereon; Fig. 3 is a detail sectional view showing the roller bearing construction for the base.

Similar parts are designated by the same reference characters in the several views.

The base or stand consists, as shown, of a lower member or table 1 which is preferably circular and is supported by a suitable number of legs which latter may be secured or fastened to a floor or other support. In order to enable the base to be arranged at the desired height above the floor and to level the base, the legs are adjustable, those shown embodying an upper member 2 which is fixed to the under side of the table 1 and a lower member 3 which is adapted to rest on the floor, these leg members being slidable relatively to one another, and a clamping bolt 4 passing through alined slots in the members serves to clamp the members and thereby secure them at the desired adjustment. A head 5 is mounted above the table 1, and in the present instance, this head carries an upwardly projecting sleeve 6. The head 5 is rotatable relatively to the table, and the present invention provides a novel and efficient anti-friction bearing between these parts. In the construction shown, the lower side of the head 5 and the upper side of the table 1 are formed with annular tracks 7 and 8, and the table 1 is also provided with an annular peripheral flange 9. A series of anti-friction rollers 10 are mounted to travel on the tracks 7 and 8 as relative rotation occurs between the head and the stationary table, the axis of these rollers being radial to the center of the tracks. The lower side of the head 5 is also formed with an annular track 11 which is parallel to the peripheral flange 9 of the table, and a series of rollers 12 travel between the track 11 and the flange 9, the latter constituting a complemental track. The axes of the rollers 12 are parallel to the axis of rotation of the head 5. Means is provided for maintaining the two sets of rollers in proper operative relation, a spider 13 being shown in the present instance which carries both sets of rollers whereby the rollers are maintained in proper spaced relation and are guided to follow their respective tracks.

The rotatable head 5 is so mounted with respect to the table 1 that it may tilt. Means is provided for yieldably resisting the tilting motion of the head and for returning the latter to its normal position. Such means in the present instance embodies a suitable number of pressure devices which are spaced circumferentially of the table and the rotatable head. Each of these devices embodies a bracket 14 which is bolted or otherwise fixed to the stationary table 1 and is provided with a standard 15 to which a lever 16 is pivoted by the pin 17. The lever 16 carries a roller 18, the axis of which is radial to the axis of rotation of the table, and each of these rollers 18 is arranged above a circular track 19 formed on the upper side of the table. Means is provided for forcing each of the rollers 18 toward the track 19 on the rotatable head, such means in the construction shown embodying a rod 20 which is attached to the lever 16, and a coiled compression spring 21 encircling the rod 20 below the fixed bracket 14 and operating on the abutment 22 on the rod, the expansive tendency of this spring operating to force the respective roller 18 downwardly and toward the track. It is preferable, however, that the rollers 18 should not engage the track 19 until the rotatable head has been tilted or deflected from its normal axis, that is to say, the rollers 18 should be just out of contact with the track 19 normally in order to minimize friction and consequent resistance to turning of the head. To effect this result, a stud 23 is threaded or otherwise attached adjustably to the lever 16, and the lower end of this stud is adapted to abut normally against the fixed bracket 14 under the action of the spring 21. This stud may be readily adjusted in a manner to limit the downward motion of the respective roller 18 under the action of the spring whereby this roller will occupy a position immediately above the track 19, although these rollers 18 will engage the track 19 immediately upon the commencement of a tilting motion of the head and the spring 21 will then be in action to resist, to the proper degree, such tilting motion and to return the head automatically to normal position when the force tending to tilt the head is relieved.

In practice, the series of rollers 10 will support the weight of the head 5 and such parts as may be mounted thereon, and the head may be turned freely while supported by these rollers, the rollers traveling about the tracks 7 and 8 during such rotation and the cage will follow the rollers and maintain them in proper relation. The rollers 12 at the same time operate to center the head 5, and these centering rollers are also maintained in proper relation by the spider which travels with them.

A base or stand of this construction is especially adapted for use in connection with apparatus for drying or otherwise handling tubular fabrics, and in so using the base, the vertical loading tube 24 is fitted over or otherwise mounted on the upwardly projecting sleeve 6 of the rotatable table whereby tilting or rotation of the loading tube will impart corresponding movements to the table. In using the base in connection with tubular fabric drying apparatus, the blowing tube or pipe which conducts dry air to the interior of the fabric may be attached to the depending flange 25 which is secured to or formed as a part of the stationary table 1. The air forced into the loading tube by the blower will not leak to an appreciable extent between the base and the rotatable head, as the periphery of the head has a close fit within the flange 9 on the table, and the maintenance of this close fit is rendered possible by the employment of the set of centering rollers. In using a loading tube of this character, the wet tubular fabric is packed thereon at the top of the tube, and during the packing of the fabric upon this loading tube, the operator frequently tilts the upper end of the tube. This tilting of the tube is permitted to occur without resistance of a degree that would strain or loosen the base or its fastenings, and the tube after being tilted in any direction is automatically returned to its normal vertical position. Also, in withdrawing the fabric from the tube during the operation of passing the fabric over a spreader to effect drying thereof or for other purposes, the loading tube may be rotated easily for the purpose of straightening out any twists in the fabric.

I claim as my invention:—

1. A base or stand for fabric drying tubes embodying a relatively fixed table, a relatively rotatable tube-supporting head arranged above the same, and anti-friction roller bearings arranged between the table and head for rotatably supporting the latter.

2. A base or stand for fabric drying tubes embodying a relatively fixed table, a relatively rotatable tube-supporting head arranged above the same, and two sets of anti-friction rollers interposed between the table and head and operative respectively to support and to center said head.

3. A base or stand for fabric drying tubes embodying a relatively fixed table, a relatively rotatable tube-supporting head, said table having two pairs of tracks arranged between them, a set of rollers coöperative with one of said pairs of tracks for rotatably supporting the head, and another set of rollers coöperative with the other pair of tracks for centering the head relatively to said table.

4. A base or stand for fabric drying tubes embodying a relatively fixed table, a relatively rotatable tube-supporting head, said table having two pairs of tracks arranged between them, a set of rollers coöperative with one of said pairs of tracks for rotatably supporting the head, another set of rollers coöperative with the other pair of tracks for centering the head relatively to said table, and a spider operative to guide and space both sets of rollers.

5. A base or stand for fabric drying tubes embodying a relatively fixed table provided with an annular flange, a tube-supporting head rotatable relatively to the table and having an annular edge coöperative with said flange to form a close substantially fluid-tight fit therewith, and an anti-friction bearing between said table and head to rotatably support the latter and to center said edge of the head relatively to said flange on the table.

6. A base for fabric drying tubes embodying a relatively fixed support, a fabric-receiving tube, and a head carrying said tube, said head and tube being freely rotatable relatively to said support and also capable of universal tilting motion under the influence of the fabric while the latter is being withdrawn from the tube.

7. A base or stand for fabric drying tubes embodying a relatively fixed table, a head capable of universal tilting motion relatively to the base and adapted to support the tube, and means operative to yieldingly resist such tilting motion.

8. A base or stand for fabric drying tubes embodying a relatively fixed table, a head capable of universal tilting motion relatively to the base and adapted to support the tube, and means operative automatically to return the head to a predetermined position relatively to the table.

9. A base or stand for fabric drying tubes embodying a relatively fixed table, a head capable of universal tilting motion relatively to the base and adapted to support the tube, and devices operative to apply yielding pressure to said head when tilted to resist such tilting motion and to automatically restore the head to a predetermined position.

10. A base or stand for fabric drying tubes embodying a relatively fixed table, a head capable of universal tilting motion relatively to the base and adapted to support the tube, and normally inactive devices operative upon tilting of the table to resist such tilting motion and to restore the head to a predetermined normal position.

11. The combination of a relatively stationary table, a tube-supporting head capable of tilting motion relatively to the base, and a set of devices spaced circumferentially of the table and head and operative when the head is tilted to press yieldingly thereon.

12. The combination of a relatively stationary table, a tube-supporting head capable or rotary and tilting motion relatively to the base, a set of pressure devices spaced circumferentially of the table and head, means tending to force said devices yieldingly toward the head, and means for holding the pressure devices out of engagement with said head except when the latter is tilted.

In testimony whereof I have hereunto set my hand in presence of two subscribing witnesses.

JOSEPH A. FIRSCHING.

Witnesses:
J. D. SEWELL,
D. DeW. SMYTH.

---

Copies of this patent may be obtained for five cents each, by addressing the "Commissioner of Patents, Washington, D. C."